July 13, 1926.
G. H. CASE
BUCKLE GUARD
Filed March 12, 1926
1,592,517
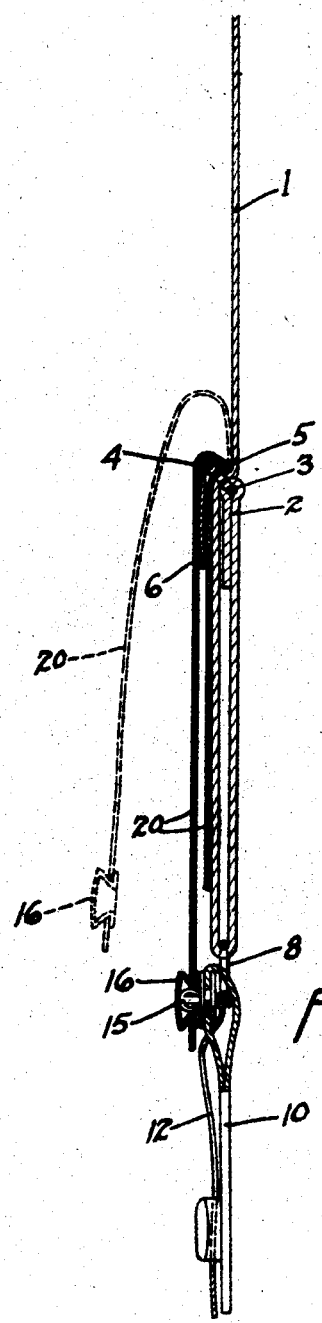
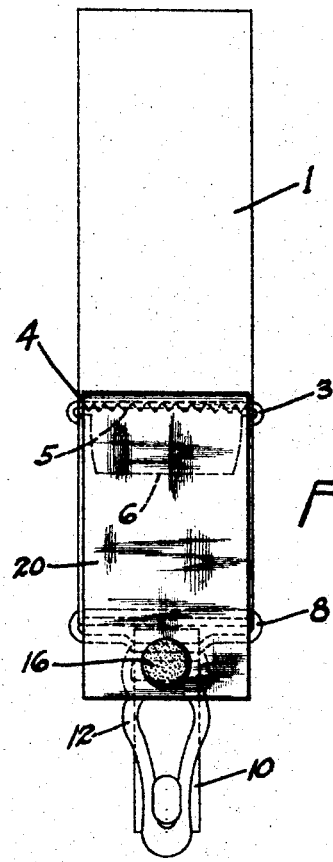
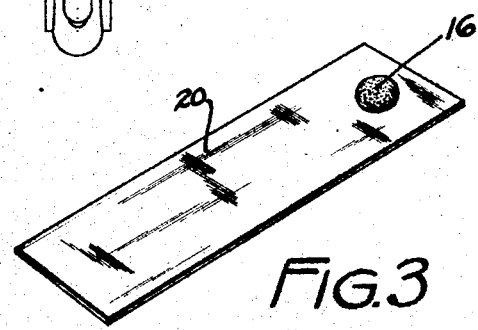
Fig. 1
Fig. 2
Fig. 3
Inventor
GRACE H. CASE
By Paul, Paul & Moore
ATTORNEYS Patented July 13, 1926.

1,592,517

UNITED STATES PATENT OFFICE.

GRACE H. CASE, OF EXCELSIOR, MINNESOTA.

BUCKLE GUARD.

Application filed March 12, 1926. Serial No. 94,231.

This invention relates to improvements in buckle guards, and has as a general object to provide a guard for a hose supporter buckle or clamp, arranged thereover, to prevent accidental loosening of clamp or engagement thereof with the undergarments. The invention finds particular application in hose supporters which have a lever-like toothed clamp member engageable with a portion of the supporter material passing through a loop upon which the clamp member is swingingly mounted.

Features of the invention include, in combination with a hose supporter having clasp and clamp or buckle members; an elastic guard member which stretches with the supporter material; a guard of sufficient length and elasticity to allow adjustment in correspondence to the length or shortening of the supporter material between clasp and clamp; a guard one end of which is detachably secured between the teeth of the clamp, and is held between the teeth of the same when the member is in clamping position; a guard which covers the front of the clamp or buckle; a guard which prevents the clamping member from opening or becoming disengaged when the supporter is under normal or super tension; a guard which, being of elastic material, is reneweable; which is detachably secured at one end by the clamp, and has its opposite end detachably secured by the clasp, when disposed in buckle or clamp covering position; and which is movable with the clamp during clamp adjustment.

Other objects and advantages will be further set forth in the description of the drawings and in said drawing;

Figure 1 is a face view of a hose supporter showing the guard covering the clamp or buckle.

Figure 2 is a longitudinal section view through the supporter, showing the guard in protecting and clamp securing position, and Figure 3 is a face of the elastic guard strip.

The device finds its most important application to elastic hose supporters, a conventional form of such supporter being shown. This supporter comprises a strip of elastic material 1, having its end permanently secured as at 2 to a loop member 3, having a toothed lever-like clamp member 4 swingingly mounted thereon, said member 4 having a row of teeth 5 engageable with a portion of the supporter material passing through the loop, and said clamp member having a thumb or finger engaging extension 6 by which the clamp is operated. The clamp action of the member 4 is well known, and it is also well known that when the supporter is under tension, and is suddenly subjected to additional tension, the clamp member often rotates to non-clamping position thus allowing the supporter to lengthen. It is therefore an object of this invention not only to provide means for preventing engagement of the clamp member with the undergarment, but to prevent disengagement or rotation of the clamp member under the above-stated conditions.

The supporter material is attached to the clamp-carrying loop member at one end as at 2, and traverses the loop 3 as shown. The clasp-carrying member comprises the metal loop 8 through which the webbing passes before traversing the loop 3. This loop 8 carries the clasp which is swingingly engaged therewith and comprises a flexible button carrying member 10 and slotted metallic button engaging member 12, this device being of the ordinary structure. The flexible button carrying member 10 is engaged around the loop 8 and upon this member is secured one member 15 of a snap fastener, with which the companion member 16 of the guard strip 20 cooperates to fasten the guard in operating position.

The guard member comprises a single piece of elastic material 20 of sufficient length to permit lengthening and shortening adjustments and thus allow for such connection to be made with the fastening device of the clasp-carrying member, as will prevent buckling of the supporter material when adjustment is made. This guard strip has one end inserted beneath the toothed fastening device as shown, thus disposing it so that when the clamping member is slid during adjustment the guard member will remain in position and slide therewith. The guard member is thus held at one end while the other is lapped over the buckle and securely but detachably connected by a fastening device 16, with the fastening device 15 of the clasp-carrying member.

Inasmuch as the strip is elastic the same can be stretched with the supporter material when in use, and moreover the guard strip can be easily applied or attached and when worn can be replaced. No permanent connection is made with any part of the supporter. Preferably the elastic guard is of a slightly greater width than the supporter material but in some instances may be slightly narrower, but wide enough to overlap and completely cover the toothed member, and prevent accidental release of the same.

I claim as my invention:

1. A device of the class described comprising an elastic hose supporter of the character set forth including a clamp and clasp, and a guard member secured by the clasp, overlying and engaging the same, and attached to the clasp.

2. A device of the class described comprising an elastic hose supporter of the character set forth including a clamp and clasp, an elastic guard member secured by the clamp, overlying said clamp and removably attached to the clasp.

3. A device of the class described comprising a hose supporter having a swinging clamp member and a clasp-carrying member, an elastic cover strip held by the clamp, overlying the same, and detachably secured at the opposite end to the clasp-carrying member.

4. A device of the class described including a hose supporter comprising a clasp-carrying member and a lever-like clamp member, having teeth, a strip of elastic material engaged by the teeth when the clamp is operative and extending in direction away from the teeth, said member extending in an opposite direction and overlying and engaging the clamp member, and detachably secured at the opposite end to the clasp-carrying member.

In witness whereof, I have hereunto set my hand this fourth day of March 1926.

GRACE H. CASE.